(12) United States Patent  (10) Patent No.: US 8,919,223 B2
Corniani  (45) Date of Patent: Dec. 30, 2014

(54) VARIABLE CAM, PARTICULARLY FOR MACHINES FOR APPLYING CLOSURES

(75) Inventor: Carlo Corniani, Marmirolo (IT)

(73) Assignee: Weightpack S.p.A. (IT)

( * ) Notice: Subject to any disclaimer, the term of this patent is extended or adjusted under 35 U.S.C. 154(b) by 0 days.

(21) Appl. No.: 13/639,909

(22) PCT Filed: Mar. 21, 2011

(86) PCT No.: PCT/EP2011/054271
§ 371 (c)(1),
(2), (4) Date: Oct. 8, 2012

(87) PCT Pub. No.: WO2011/124464
PCT Pub. Date: Oct. 13, 2011

(65) Prior Publication Data
US 2013/0036860 A1   Feb. 14, 2013

(30) Foreign Application Priority Data

Apr. 8, 2010  (IT) ............... MI2010A0587

(51) Int. Cl.
*F16H 53/04*  (2006.01)
(52) U.S. Cl.
CPC .................... *F16H 53/04* (2013.01)
USPC ........................................ 74/568 R
(58) Field of Classification Search
USPC ............. 74/567, 568 R; 53/133.2, 272, 329
See application file for complete search history.

(56) References Cited

U.S. PATENT DOCUMENTS 3,537,231 A * 11/1970 Dimond ................. 53/201
4,099,361 A *  7/1978 Dix et al. .............. 53/488
4,926,707 A *  5/1990 Yamada ................ 74/96
6,505,590 B1 *  1/2003 Rao et al. ............. 123/90.24

FOREIGN PATENT DOCUMENTS

EP  0559946 A1  9/1993
FR  697903 A   1/1931
FR  2734806 A1  12/1996

OTHER PUBLICATIONS

International Search Report; International Application No. PCT/EP2011/054271; International Filing Date Mar. 21, 2011; Mail date May 4, 2011.
Written Opinion International Application No. PCT/EP2011/054271; International Filing Date Mar. 21, 2011; Mail date May 4, 2011.

* cited by examiner

*Primary Examiner* — Vicky Johnson
(74) *Attorney, Agent, or Firm* — Cantor Colburn LLP

(57) ABSTRACT

A variable cam comprises a cylindrical skirt with a track followed by a roller movable along a guide comprised within a rotating structure, which is coaxial to the skirt. The track is interrupted at a portion in the region of maximum elevation of the roller. The cam comprises two arc-like elements proximate to the track portions proximate, on opposite sides, to the interruption. Each arc-like element is guided along a path in which, in each position a portion of a first portion of a side of the element is adjacent to the corresponding portion proximate lo the interruption. A second portion of the side, joined with the first portion, is contained within a plane perpendicular to the skin axis. The presence is determined of a track portion within a plane perpendicular to the skirt axis between the ends of the arc-like elements and is adjacent, in every position occupied by the arc-like elements, to a portion of the second portion.

3 Claims, 6 Drawing Sheets

VARIABLE CAM, PARTICULARLY FOR MACHINES FOR APPLYING CLOSURES

TECHNICAL FIELD

The invention relates to a variable cam, particularly for machines for applying closures.

BACKGROUND OF THE INVENTION

It is known that many types of machines use a device, known as cam, comprising a cylindrical skirt which has, on its wall, a track that is designed to be followed by at least one follower roller, which is supported by a guide comprised in a rotating structure which is coaxial to said skirt; in particular, the follower roller is kept in contact with the track by adapted means, such as an actuation cylinder, thus providing a situation known as "forced mating".

Accordingly, the follower roller assumes a rule of motion that is determined by the shape of the track provided on the skirt, and this determines, in cams provided according to the background art, a univocal situation, in that a cam is capable of guiding the follower rollers that are connected to it according to a single and very precise rule of motion.

Obviously, such follower rollers are each connected to means designed to work in the most disparate situations, which can change even frequently during the use of the machine that comprises such rollers, as occurs for example if such means are required to manage objects that can undergo dimensional variations depending on the requests that the machine is called to meet.

This is the case, for example, of machines known as cappers, which are designed to apply pistol-shaped closures, commonly known as triggers, which are provided with a drawing straw that has a variable length as a function of the dimensions of the containers to be capped.

SUMMARY OF THE INVENTION

The aim of the present invention is to provide a cam that allows to change at will, with very simple maneuvers, the stroke of the follower rollers connected thereto, i.e., the distance comprised between the maximum and minimum levels that the rollers are designed to occupy in their path, keeping unchanged optimum motion conditions such as to exclude in particular collisions and discontinuities that might cause stresses and wear.

This aim is achieved by a variable cam according to the invention, characterized in that it comprises the features disclosed in the appended claims.

BRIEF DESCRIPTION OF THE DRAWINGS

Further characteristics and advantages will become better apparent from the description of a preferred but not exclusive embodiment of the invention, illustrated by way of non-limiting example in the accompanying drawings, wherein.

DESCRIPTION OF THE PREFERRED EMBODIMENTS

Figure 1:
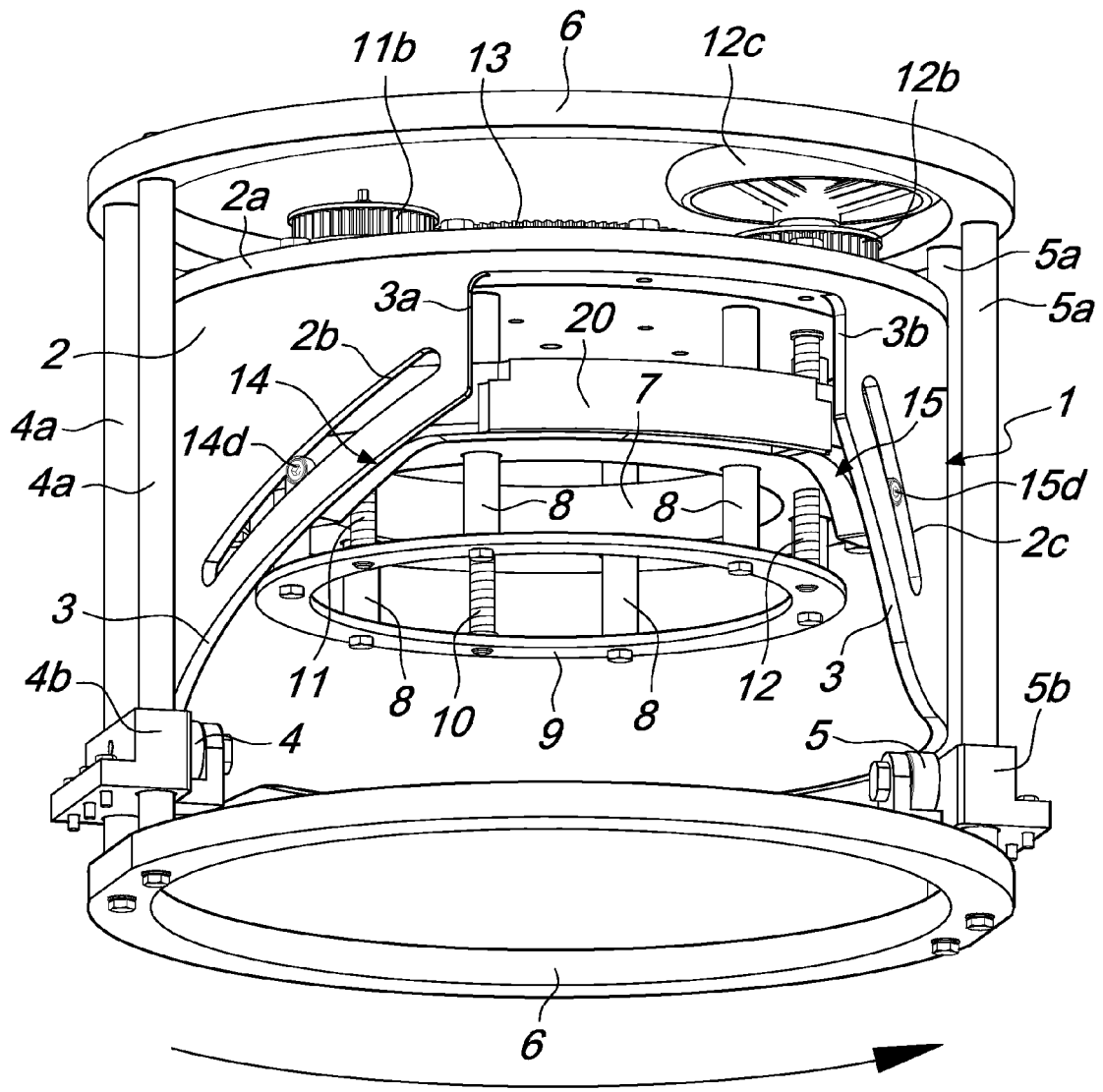
FIG. 1 is a view of the cam inserted in the structure that comprises the follower rollers, in a situation that is intermediate between the two allowed extreme situations.
Figure 2:
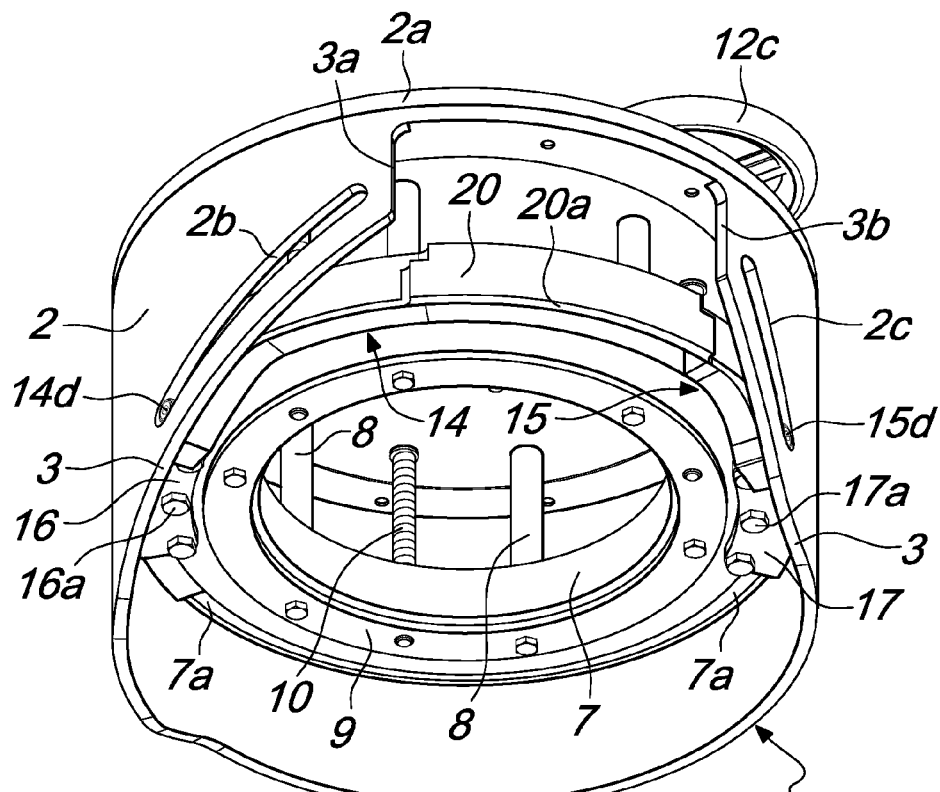
FIGS. 2 and 3 are views, taken from different viewpoints, of the cam in the configuration that induces the follower rollers to a path with minimum stroke between the occupied extreme levels.
Figure 3:
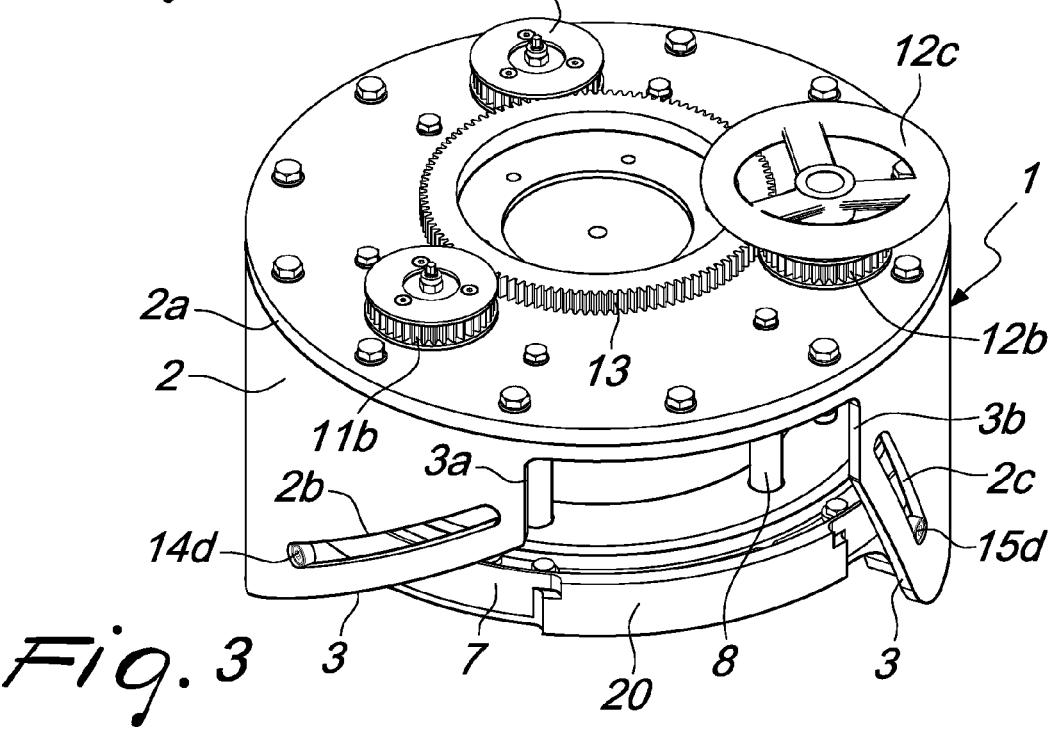
Figure 4:
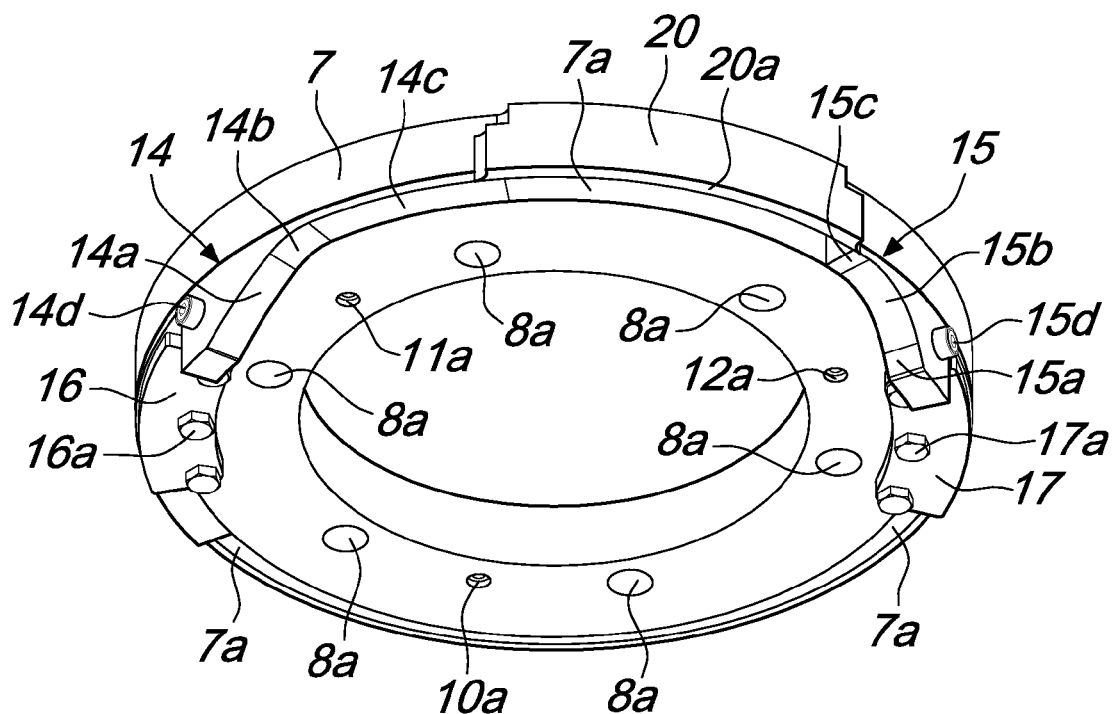
FIGS. 4 and 5 are views of the ring comprised in the cam in the configuration shown in FIGS. 2 and 3.
Figure 5:
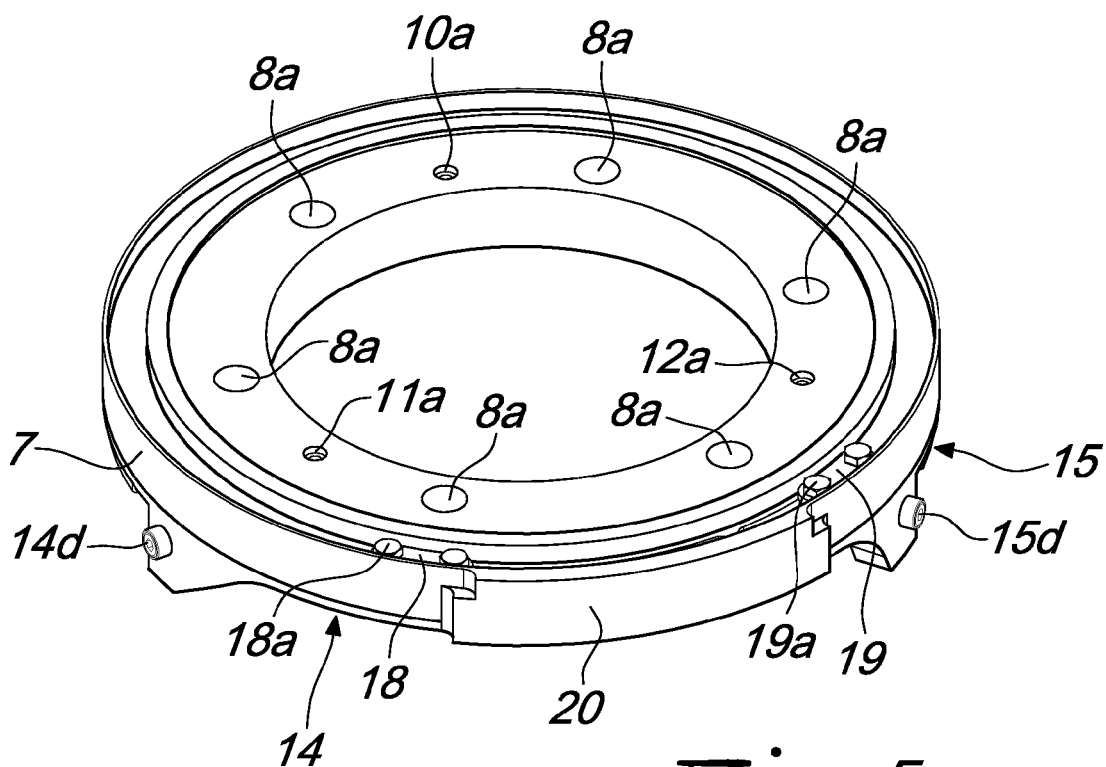
Figure 6:
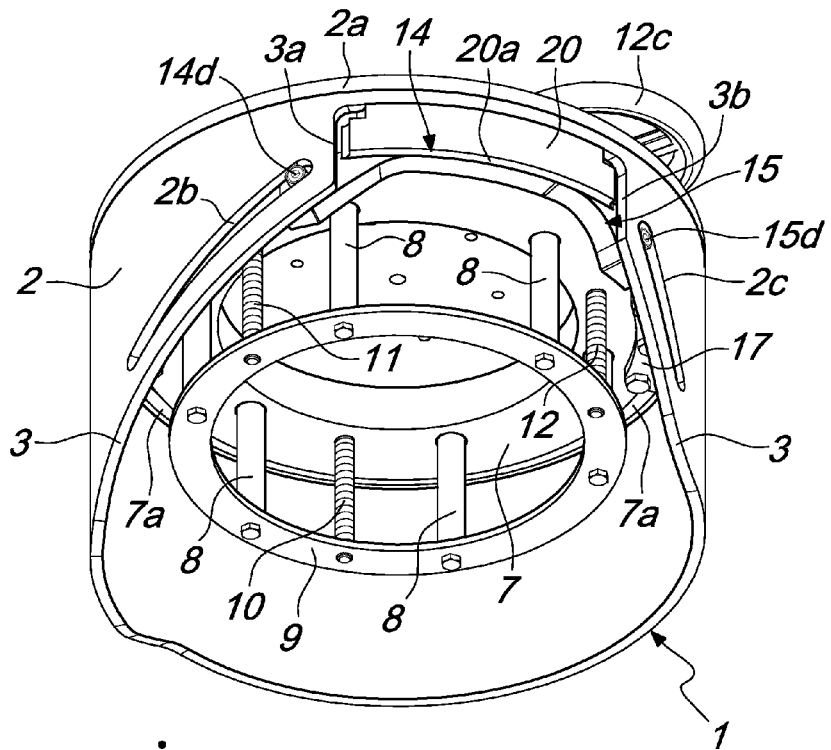
FIGS. 6 and 7 are views of the cam in the configuration that induces the follower rollers to a path with maximum stroke.
Figure 7:
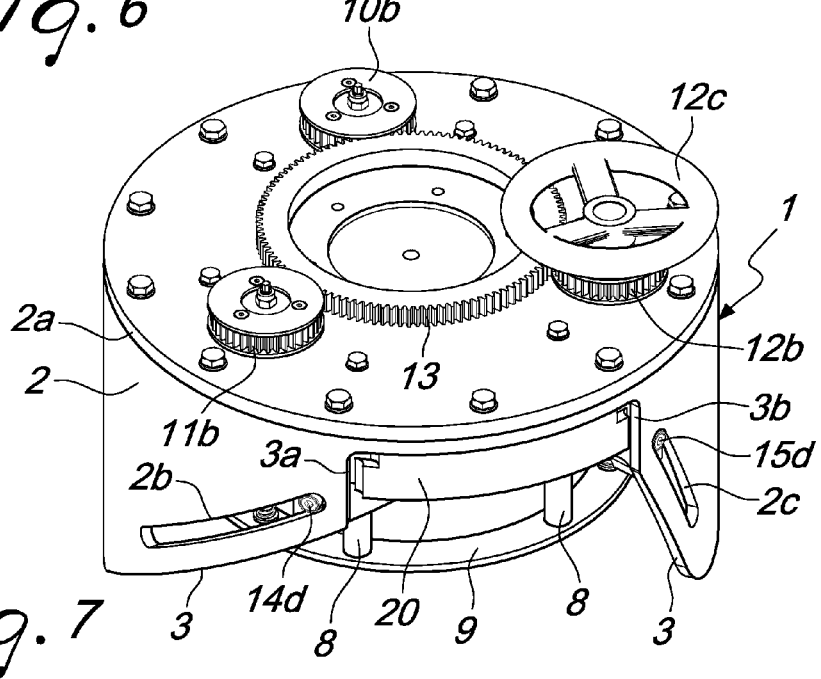
Figure 8:
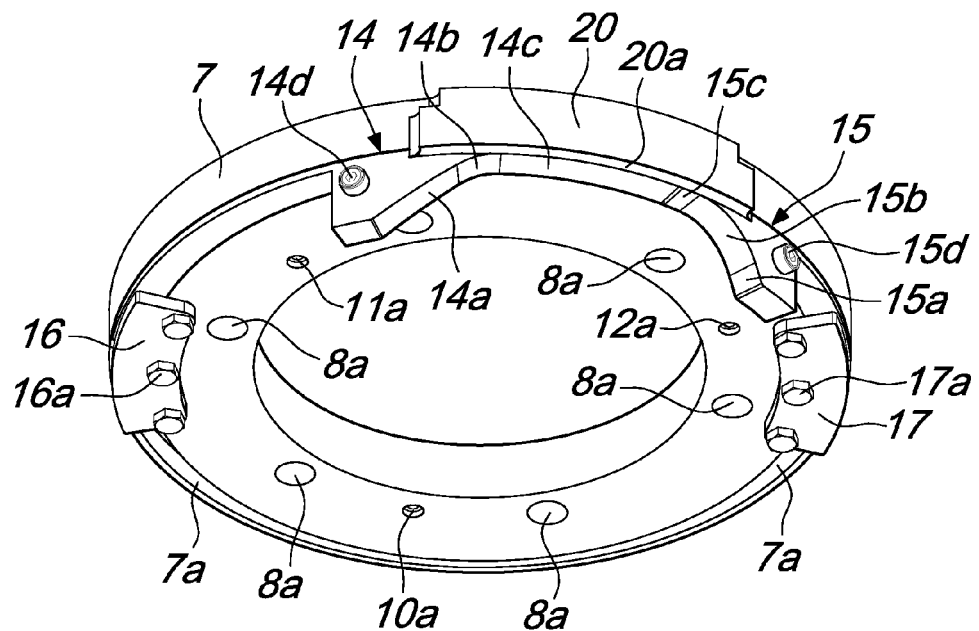
FIGS. 8 and 9 are views of the ring comprised in the cam in the configuration shown in FIGS. 6 and 7.
Figure 9:
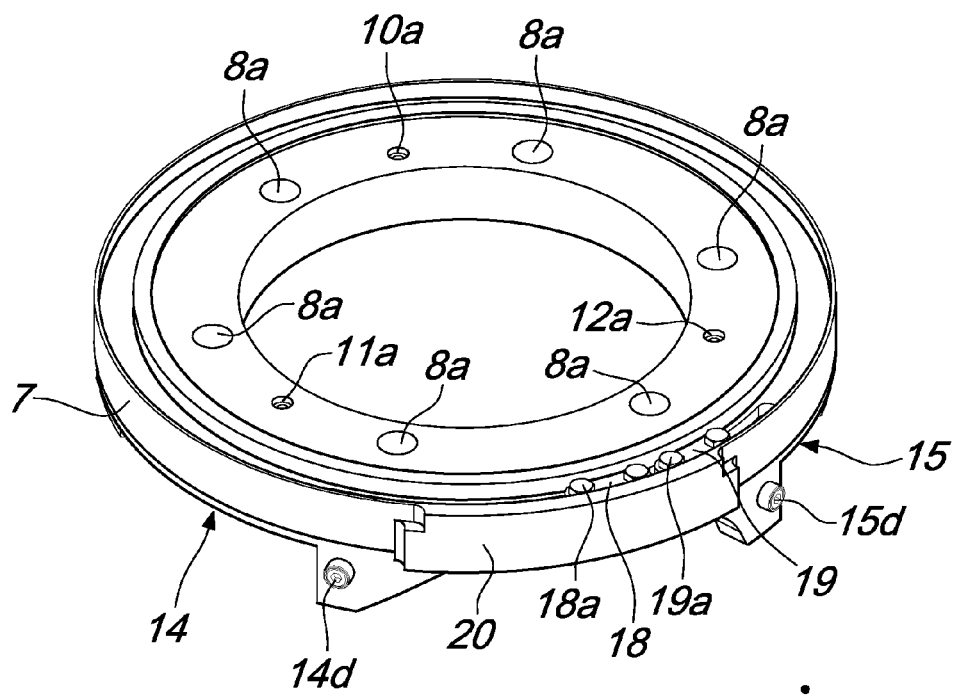
Figure 10:
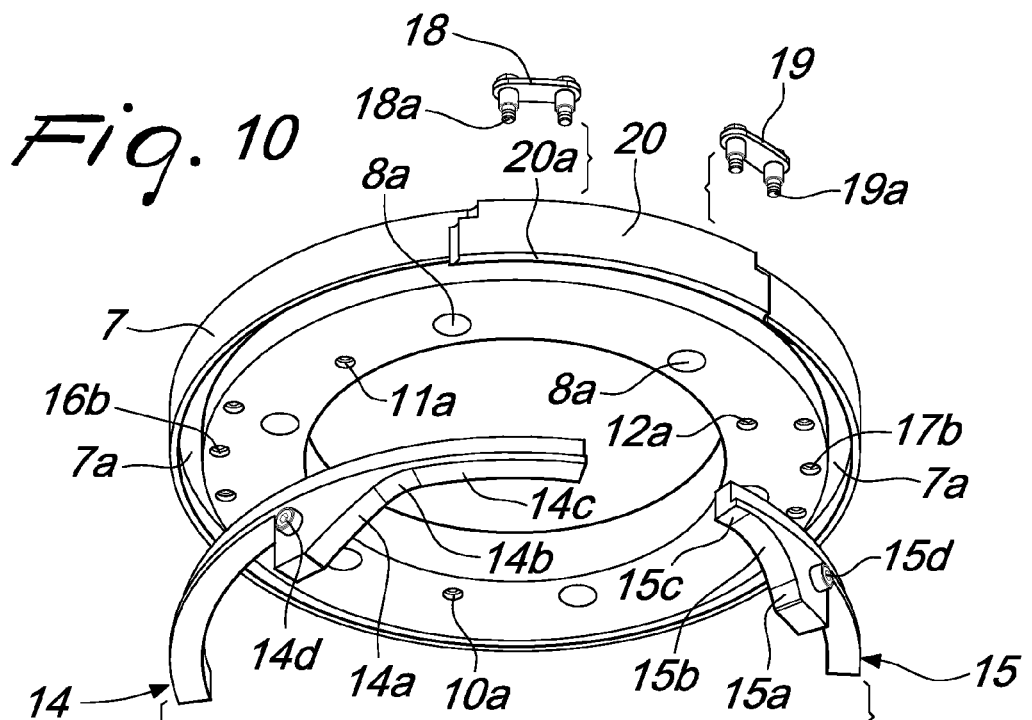
FIGS. 10 and 11 are exploded views of the ring.
Figure 11:
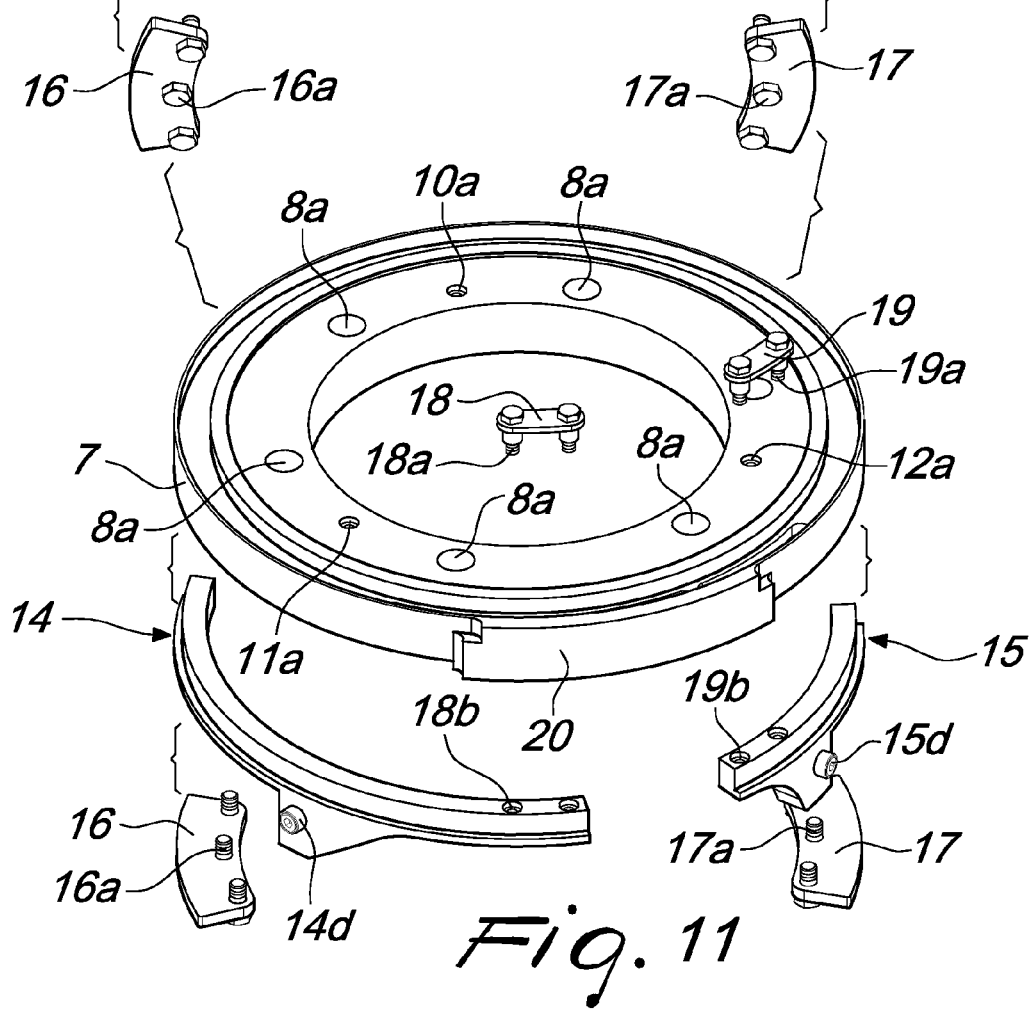

With reference to the figures, and in particular to FIG. 1, the reference numeral 1 generally designates a variable cam, which has a cylindrical skirt 2 comprising a highlighted track 3, which is designed to be followed, as shown in FIG. 1, by two follower rollers 4 and 5, which can move along respective guides 4a, 5a comprised within a structure 6, which rotates in the direction indicated by the arrow in the figure, which is coaxial to the skirt 2, being kept in contact with the track 3 by forced mating by way of adapted means, such as for example pneumatic cylinders not shown in the figure.

The follower rollers 4 and 5 are connected respectively to plates 4b, 5b, which, in a particular embodiment, might support means for the removable engagement of triggers to be inserted in containers on a filling line.

It can be seen immediately that the track 3 is interrupted by faces 3a, 3b at a portion comprised between such faces, that is located in the region of maximum elevation of the follower rollers 4 and 5.

The cam according to the invention further comprises a ring 7, which is comprised within the cylindrical skirt 2 and is provided with movement means adapted to provide a translational motion thereof, along the axis of the skirt, which is guided by guiding columns 8, which extend from a cover 2a of the skirt 2, are fixed at the base to an annular plate 9, and are associated with such ring at holes 8a.

The means for moving the ring 7 comprise three threaded stems 10, 11, 12, which are associated respectively with holes 10a, 11a, 12a that are present in said ring and are actuated simultaneously, so as to ensure correct movements of the ring, since they are provided with respective toothed pinions 10b, 11b, 12b, all of which are associated with a ring gear 13; the motion is imparted, when necessary, to the described assembly by the user by means of a handwheel 12c, which is directly associated with a pinion 12b.

The ring 7 comprises a circular seat 7a for the containment of the two arc-like elements designated generally by the reference numerals 14 and 15, which can slide within such seat, being kept in position by means of the two underlying plates, respectively 16 and 17, which are fixed to the ring 7 by way of screws 16a, 17a associated with threaded holes 16b, 17b, and by means of two overlying plates 18 and 19, which are fixed respectively to the arc-like elements 14 and 15 by means of screws 18a, 19a associated with threaded holes 18b, 19b.

The arc-like elements 14 and 15 have the side that protrudes from the seat 7a which is contoured so as to define first portions, respectively 14a, 15a, such that in all the positions occupied in the motion described hereinafter they are at least partially adjacent without discontinuities with respect to the corresponding portions of the track 3 that are proximate to the interruption of said track, and said first portions are connected, by means of the intermediate portions 14b, 15b, to second portions, respectively 14c, 15c, which are always contained on a plane that is perpendicular to the axis of the cylindrical skirt 2.

With respect to the arc-like elements 14 and 15, it should be noted that there are thereon rollers 14d, 15d, which are designed to be accommodated in the slots, respectively 2b, 2c, provided in the wall of the skirt 2 in order to guide such elements in their path, as will be described in greater detail hereinafter.

Finally, the reference numeral 20 designates a front, which is derived monolithically so as to protrude from the ring 7 in the region that corresponds to the interruption of the track 3, which has a lower side 20a contained on a plane that is perpendicular to the axis of the cylindrical skirt 2.

Operation of the invention is as follows:

As seen in FIGS. 2, 3, 4, 5, when the cam is in this configuration, the track followed by the follower rollers 4 and 5 is defined first of all by the portion 3 obtained from the skirt 2 and is followed, after leaving the portion 3, by the portion 15a of the arc-like element 15 on which said follower rollers pass unnoticeably thanks to the fact that such portion is arranged, as said previously, laterally adjacent to the portion 3 without discontinuities.

The portions 15b and 15c of the element 15 and then the portion 20a provided on the front 20 are then followed, and the follower rollers pass between the portions 15c and 20a without problems, since such portions are arranged so as to be coplanar.

The path of the follower rollers 4 and 5 occurs in a similar manner after leaving the portion 20a, at the portions 14c, 14b, 14a of the element 14, and the rollers again pass from the portion 14a into contact with the portion 3.

The cam 1, in the configuration described above, has induced the follower rollers 4 and 5 to a path with minimal stroke from the lowest level, assumed in contact with the track portion 3 that is diametrically opposite with respect to the interruption of such track, to the highest level, assumed in contact with the portion 20a.

However, the cam 1 lends itself to changing its shape in order to follow different operating requirements, passing through intermediate changes such as the one shown in FIG. 1, which follow one another continuously up to the configuration shown in FIGS. 6, 7, 8, 9, which allows to provide a path of the follower rollers with the maximum stroke between the lowest level, which remains always the same, and the highest level in contact with the portion 20a, which the operator can vary with very simple maneuvers.

It is in fact sufficient to act on the handwheel 12c to cause the rise of the ring 7, with consequent lifting of the portion 20a and entrainment of the annular elements 14 and 15, which, conveniently guided by the contact of the corresponding rollers 14d, 15d with the respective slots 2b, 2c, arrange their portions 14a, 14b, 14c and 15a, 15b, 15c so as to define the track that the follower rollers 4 and 5 will follow with the optimum conditions described earlier.

The described invention is susceptible of numerous modifications and variations, all which are within the scope of the appended claims; all the details may further be replaced with other technically equivalent elements.

The disclosures in Italian Patent Application No. MI2010A000587 from which this application claims priority are incorporated herein by reference.

The invention claimed is:

1. A variable cam, comprising:
a cylindrical skirt comprising a track designed to be followed, with a forced mating, by at least one follower roller movable along a guide which is comprised within a rotating supporting structure, which is coaxial to said cylindrical skirt, said track being interrupted at an interrupted portion located in the region of maximum elevation of said follower roller,
a ring arranged within said cylindrical skirt and movable with a translational motion along an axis of said cylindrical skirt
two arc-like elements contained within a circular seat of said ring, said two arc-like elements being located proximate to portions of the track comprised in the cylindrical skirt that are located proximate, on opposite sides, to the interrupted portion of said track, each arc-like element of said two arc-like elements being slidably supported within said circular seat of said ring along a path in which, in each position progressively occupied by said each arc-like element as said ring moves with said translational motion along said axis of said cylindrical skirt, at least one portion of a first portion of a side of said each arc-like element is adjacent, without discontinuities, to a corresponding portion of said track that is proximate to the interrupted portion of said track, while a second portion of said side, joined with the first portion, is contained within a plane that is perpendicular to the axis of said cylindrical skirt;
a front connected to said ring, said front having a front side contained within a plane that is perpendicular to the axis of the cylindrical skirt, said front side being arranged adjacent to said interrupted portion of said track between two mutually facing ends of the two arc-like elements and being arranged adjacent, without discontinuities, in every position progressively occupied by said arc-like elements within said circular seat of said ring, to at least one portion of the second portion of said side of each one of said arc-like elements.

2. The cam according to claim 1, wherein the wall of the cylindrical skirt has, for said each arc-like element, a slot for accommodating a roller that is jointly connected to said each arc-like element in order to guide said each arc-like element during movements of said ring.

3. The cam according to claim 2, comprising a plurality of guiding columns for said ring that extend from a cover of said skirt, and a plurality of simultaneously actuable threaded stems, which are associated with holes provided in said ring.

* * * * *